United States Patent Office 2,720,483
Patented Oct. 11, 1955

2,720,483

METHOD OF OBTAINING A CONJUGATED-ESTROGEN PREPARATION

Eric T. Stiller, Westfield, and Andrew Ellis O'Keeffe, Metuchen, N. J., assignors, by mesne assignments, to Olin Mathieson Chemical Corporation, a corporation of Virginia No Drawing. Application February 21, 1951, Serial No. 212,201

5 Claims. (Cl. 167—74.5)

It is the object of this invention to provide an improved method of obtaining a conjugated-estrogen preparation from gravid-mares' urine.

Estrogenic preparations are used in a considerable variety of conditions associated with a deficiency of estrogens (including treatment of the symptoms of the menopause syndrome, natural or artificial, senile vaginitis, kraurosis vulvae, pruritis vulvae, and hypogenitalism). Typical conjugated-estrogen preparations contain sodium estrone sulfate as the principal estrogen, a (variable) small amount of other equine estrogens, and a relatively large quantity of nonestrogenic material, and are obtained from gravid-mares' urine by relatively complex and inefficient methods.

For example, one (unsatisfactory) process involves adsorption on charcoal, elution from the adsorbent with an organic nitrogen-containing base, and concentration of the eluate. In another process, which utilizes a butanol extraction, considerable difficulty is encountered with the formation of an emulsion.

The method of this invention essentially comprises intimately contacting an aqueous solution of impure estrogenic preparation with a solution of a long-chain aliphatic amine in a substantially water-immiscible organic solvent for the amine at a pH no higher than about 12, separating the organic solvent phase, and recovering a purified estrogenic preparation therefrom. As the impure estrogenic preparation there may be used a fresh, spray-dried, reconstituted, concentrated or partially purified gravid-mares' urine, and the urine use should be obtained from mares pregnant at least five months. ("Reconstituted" is a term commonly used throughout the pharmaceutical industry to designate a material which has been placed back into solution in the same solvent and substantially the same concentration. Thus, the term as employed herein refers to gravid mares' urine which has been spray-dried and the solids redissolved in water to substantially the original concentration.)

The utilizable long-chain aliphatic amines (which function as carriers) have chains of more than six carbon atoms and include, inter alia: stearyl-dimethyl amine, n-octylamine, methyl-dioctylamine, ethyl-octylamine, ethyl-nonylamine, and (notably) n-dodecylamine. The substantially water-immiscible organic solvents which may be used include, inter alia: aliphatic alcohols, such as n-amyl (1-pentanol), n-butanol (1-butanol), secondary butanol, methyl-isobutyl-carbinol, methyl-amyl-carbinol, methyl-isopropyl-carbinol, isobutyl-carbinol, 2-ethyl-hexanol, and amyl alcohol mixtures, such as refined fermentation-amyl-alcohol; aliphatic alcohol esters of lower fatty acids, such as the acetate of methyl-isobutyl-carbinol, and amyl acetate; aliphatic ketones, such as methyl-isobutyl-ketone; aliphatic ethers, such as di-n-butylether, and diethyl ether; hydrocarbons, such as benzene and toluene; and halogenated hydrocarbons, such as ethylene dichloride, chloroform and carbon tetrachloride. Where the long-chain aliphatic amine is a liquid, as in the case of n-octylamine, it may perform the functions of both the carrier and organic solvent.

While the conjugated estrogens are carried by the long-chain aliphatic amine in a substantially water-immiscible organic solvent at all pH levels below 12, the carrier extraction is most efficient at a pH of the order of 3.5. This estrogenic-rich carrier extract is then treated to remove the solvent and/or the carrier, preferably both, and from said residue a purified estrogenic preparation is obtained.

The purified conjugated-estrogen preparations obtained by the method of this invention may be therapeutically used per se (e. g., in tablet or aqueous-alcohol-solution form) or converted to a water-insoluble (nonconjugated) estrogen preparation and therapeutically used in that form. Such conversion may be effected by conventional acid or other hydrolysis.

Inasmuch as estrone sulfate is readily hydrolyzed, temperatures above 100° C. should be avoided in the practice of this invention; and preferably the temperatures should be below 50° C.

The following examples are illustrative of the invention:

*Example 1*

100 gm. of spray-dried gravid-mares' urine, having a potency of about 415 microgram/gm., is dissolved in 330 ml. water; the small amount of insoluble residue is removed by filtration; and the filtrate is extracted with 2 x 190 ml. portions of toluene to remove the unconjugated estrogens. The aqueous phase is then extracted with 2 x 66 ml. portions of a 10% solution of n-dodecylamine in a mixture of synthetic amyl alcohols (e. g., Pentasol). The Pentasol phase is separated and is passed through a 15 x 200 mm. column of the hydrogen form of a cation exchange resin (e. g., Amberlite IR–100); and the (effluent) Pentasol solution is extracted with water. The resulting aqueous phase is then freeze-dried and the residue is distributed between ether and water. The ether phase is extracted with water at pH 12, and this resulting aqueous phase is neutralized and freeze-dried, yielding a therapeutically utilizable conjugated-estrogen preparation. The proportion of n-dodecylamine to units of conjugated-estrogens employed in the foregoing example may be varied, the n-dodecylamine carrier being demonstrably essential to the extraction into the organic solvent phase, but an excess of the carrier not interfering with the extraction. Obviously, however, the amount of carrier used should be the minimum required for efficient extraction, which amount is readily determinable for each impure conjugated-estrogen preparation treated.

*Example 2*

27 ml. of the n-dodecylamine-Pentasol extract described in Example 1 is passed through two 15 x 200 mm. columns of a cation exchange resin (e. g., Amberlite IR–100) and is concentrated to a thick oil. This oil is then steam distilled in the presence of a saturated aqueous solution of sodium carbonate to remove residual amine; and the residue is extracted into ethanol. The ethanol is displaced by water (through distillation) and the resulting aqueous solution is freeze-dried, yielding a therapeutically utilizable conjugated estrogen preparation.

1.5 gm. of this product is then dissolved in 70 ml. of n-butanol, washed repeatedly with water, and the butanol displaced by water (distillation); and the resulting aqueous solution is freeze-dried. The further purified product gives a positive test for sulfate; and an aqueous solution thereof retains all of its activity when shaken with toluene, indicating absence of free estrone.

A (preferred) modification of the foregoing procedure is as follows: the carrier extract is steam distilled over sodium carbonate (to remove both carrier and solvent), the residue is extracted with n-butanol, concentrated, and crystallized from methanol.

Example 3

10 mg. of a commercial preparation of gravid mares' urine (stated by the manufacturer to contain 31.25 micrograms/mg. of conjugated estrogens) in 35 ml. water is extracted with 35 ml. of amyl alcohol containing 10% (by volume) of n-dodecylamine; and the extract is treated by any of the procedures described hereinbefore to obtain a therapeutically utilizable conjugated estrogen preparation.

Example 4

60 mg. of the commercial preparation used in Example 3 in 250 ml. water is stirred with 250 ml. of a mixture of synthetic amyl alcohols (e. g., Pentasol) containing 20 ml. n-dodecylamine. The mixture is then adjusted to pH 11, and the n-dodecylamine-Pentasol phase is separated. (Analysis indicates that over 90% of the estrogenic material is in this phase; and similar extraction is obtained at pH 8.1, 5.2 or 1.0.) The extract, treated by any of the procedures described hereinbefore, yields a therapeutically utilizable conjugated estrogen preparation.

Example 5

0.35 g. of the commercial preparation used in Example 3 is dissolved in 12.5 ml. water; and the solution is intimately mixed with a solution of 1.0 ml. n-dodecylamine in 12.5 ml. mixed synthetic amyl alcohols (e. g., Pentasol). The mixture is then adjusted to pH 3.5 by adding aqueous hydrochloric acid, and the n-dodecylamine-Pentasol phase is separated. (Analysis indicates that about 95% of the conjugated-estrogen content has been extracted; and good results are also obtained at pH 11.6, 10.4 and 0.9.) The extract, treated by any of the procedures described hereinbefore, yields a therapeutically utilizable estrogen preparation.

The invention may be variously otherwise embodied within the scope of the appended claims.

We claim:

1. The method of extracting conjugated estrogens from gravid mares' urine, which essentially comprises intimately contacting said urine with a solution of a long chain alkyl amine in a substantially water-immiscible liquid organic solvent for said amine, which solvent is a member of the class consisting of alkanols, lower fatty acid esters of alkanols, alkyl ketones, alkyl ethers, hydrocarbons and halogenated hydrocarbons, at a pH of about 0.9 to about 12; separating the organic solvent phase; and recovering the purified conjugated estrogen therefrom.

2. The method of claim 1, wherein the pH is of the order of 3.5.

3. The method of claim 1, wherein the long-chain alkyl amine is n-dodecylamine.

4. The method of claim 1, wherein the substantially water-immiscible organic solvent is a mixture of synthetic amyl alcohols.

5. The method of claim 1, wherein the long-chain alkyl amine is n-dodecylamine and the substantially water-immiscible organic solvent is a mixture of synthetic amyl alcohols.

References Cited in the file of this patent

UNITED STATES PATENTS

| Number | Name | Date |
|---|---|---|
| 2,375,979 | Doisy | May 15, 1945 |
| 2,398,185 | Lee | Apr. 9, 1946 |
| 2,429,398 | Cook et al. | Oct. 21, 1947 |
| 2,519,516 | Turner et al. | Aug. 22, 1950 |
| 2,534,121 | Grant | Dec. 12, 1950 |

OTHER REFERENCES

Swart et al., article in Arch. of Biochem., vol. 24, November 1949, p. 98.